United States Patent
Szmuszkovicz

[11] 3,853,904
[45] Dec. 10, 1974

[54] DIBENZA-[B,F]-S-TRIAZOLO-[4,3-D][1,4]OXAZEPIN-3-(2H)-ONES

[75] Inventor: Jacob Szmuszkovicz, Kalamazoo, Mich.

[73] Assignee: The Upjohn Company, Kalamazoo, Mich.

[22] Filed: Aug. 7, 1973

[21] Appl. No.: 386,278

Related U.S. Application Data

[63] Continuation-in-part of Ser. No. 307,113, Nov. 16, 1972, abandoned, which is a continuation-in-part of Ser. No. 220,405, Jan. 24, 1972, abandoned.

[52] U.S. Cl. .......... 260/308 C, 71/92, 260/239.3 T, 260/268 PC, 260/293.58, 424/250, 424/267, 424/269
[51] Int. Cl. ........................................... C07d 99/02
[58] Field of Search ....... 260/308 C, 268 PC:293.58

[56] References Cited
UNITED STATES PATENTS
3,646,055   2/1972   Hester ........................... 260/308 C
3,701,778   10/1972   Van Der Burg ............... 260/268 PC Primary Examiner—Alton D. Rollins

[57] ABSTRACT

Compounds of the formula III:

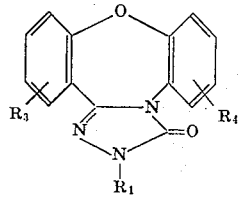

wherein $R_1$ is selected from the group consisting of hydrogen, alkyl of 1 to 3 carbon atoms, inclusive and

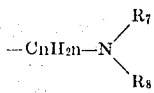

in which $R_7$ and $R_8$ are hydrogen and alkyl, as defined above and n is 2 or 3, or together

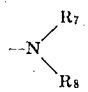

is pyrrolidino, piperidino or N-methylpiperazino; wherein $R_3$ and $R_4$ are hydrogen, fluoro, chloro, bromo, nitro, alkyl defined as above, trifluoromethyl, or alkoxy, of 1 to 3 carbon atoms, inclusive, are prepared by reacting a thio compound of formula I:

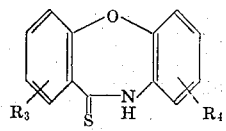

wherein $R_3$ and $R_4$ are defined as above, in sequence;

1. with an alkylcarbazate; and the resulting intermediate product II
2. with an alkylating agent of the formula $R_1'X$ in which $R_1'$ is alkyl,

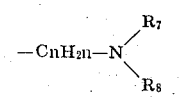

as defined above and X is chlorine, bromine, or iodine, to obtain a compound III as defined above.

Compounds of formula III and the pharmacologically acceptable acid addition salts thereof have anti-depressant activity and tranquilizing activity and can be used in mammals.

13 Claims, No Drawings

DIBENZA-[B,F]-S-TRIAZOLO-[4,3-D][1,4]OXAZEPIN-3-(2H)-ONES

CROSS REFERENCE TO RELATED APPLICATIONS

This is a continuation-in-part of application Ser. No. 307,113 filed Nov. 16, 1972, and now abandoned which is a continuation-in-part of application Ser. No. 220,405, filed Jan. 24, 1972 and now abandoned.

BACKGROUND OF THE INVENTION

Field of the Invention

This invention is directed to new organic compounds and is particularly concerned with novel compounds II and III and a process for the production thereof.

The novel compounds and the process of production therefor can be illustratively represented as follows:

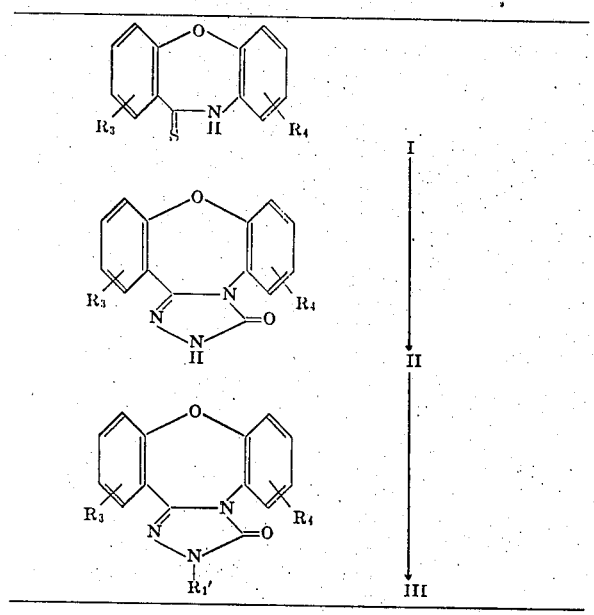

wherein $R_1'$ is alky of 1 to 3 carbon atoms, inclusive or

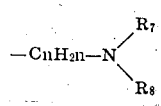

in which $R_7$ and $R_8$ are hydrogen or alkyl, defined above, and $n$ is 2 or 3 or together

is pyrrolidino, N-methylpiperazino, or piperidino; and wherein $R_3$ and $R_4$ are hydrogen, fluoro, chloro, bromo, alkyl defined as above, trifluoromethyl, and or alkoxy, of 1 to 3 carbon atoms, inclusive.

The more desirable products of this invention have the formula IIIA

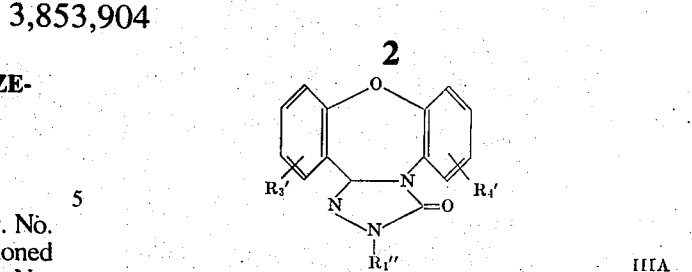

wherein $R_1''$ is alkyl of 1 to 3 carbon atoms, inclusive, or

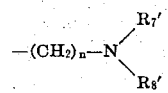

in which $n$ is 2 or 3 and $R_7$ and $R_8$ are alkyl defined as above, and wherein $R_3'$ and $R_4'$ are hydrogen, fluoro, chloro, or bromo.

The most desirable products of this invention have the formula IIIB:

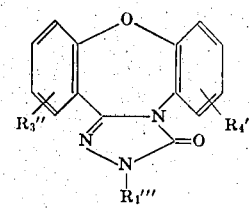

wherein $R_1'''$ is

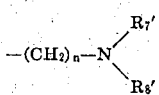

in which $n$ is 2 or 3, and $R_7'$ and $R_8'$ are alkyl of 1 to 3 carbon atoms, inclusive; and wherein $R_3''$ and $R_4''$ are hydrogen or chlorine.

The invention also embraces the pharmacologically acceptable acid addition salts thereof of the compounds of formula III (including compound IIIA and IIIB) above.

The process of this invention comprises heating a thio compound of formula I with an alkyl carbazate to obtain the triazolone compound II and alkylating II with a compound of formula $ClR_1'$, $BrR_1'$, or $IR_1'$ in which $R_1'$ is alkyl of 1 to 3 carbon atoms, inclusive, or $$-(CH_2)_n-N\begin{matrix}R_7'\\R_8'\end{matrix}$$

wherein n, $R_7$ and $R_8$ or $$-N\begin{matrix}R_7\\R_8\end{matrix}$$

are defined as above.

DESCRIPTION OF THE PREFERRED EMBODIMENT

Lower alkyl groups of 1 to 3 carbon atoms, inclusive, are exemplified by methyl, ethyl, propyl, and isopropyl.

The carbon chain moiety of alkoxy, which is of 1 to 3 carbon atoms, inclusive, can be defined as loweralkyl of 1 to 3 carbon atoms, inclusive, as above.

The novel compounds of formula III and pharmacologically acceptable acid addition salts thereof have tranquilizing and antidepressant activity and are thus useful for the treatment of depression and anxiety in mammals or birds.

For example the tranquilizing and sedative activity of 2-[2-(dimethylamino)ethyl]dibenzo[b,f]-s-triazolo[4,3-d]-[1,4]oxazepine-3(2H)-one (test Compound A) was determined as follows:

Chimney test:

[Med. Exp. 4, 11 (1961)]: The effective intraperitoneal dossage for 50% of the mice ($ED_{50}$) is 36 mg./kg. The test determines the ability of mice to back up and out of a vertical glass cylinder within 30 seconds. At the effective dosage, 50% of the mice failed doing it.

Dish test:

Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of the test compound at which 50% of the mice remain in the dish. The $ED_{50}$ (intraperitoneal administration) for this test compound A is 3.6 mg./kg.

Pedestal test:

The untreated mouse leaves the pedestal in less than a minute to climb back to the floor of the standard mouse box. Tranquilized mice will stay on the pedestal for more than 1 minute. The $ED_{50}$ (intraperitoneal administration) is 28 mg./kg.

The main function of an anti-depressant if to return the depressed individual up to normal function. This should be carefully differentiated from psychic stimulants such as the amphetamines which produce overstimulation in the normal individual.

Many different methods have been and are used to evaluate antidepressant activity. In general these methods involve antagonism to a depressant such as reserpine or tetrabenazine or a synergistic increase of the toxicity of certain compounds (i.e. yohimbine or 3,4-dihydroxyphenylalanine) and comparison of the drug action of the new compound with other known antidepressants. No single test alone can determine whether or not a new compound is an antidepressant or not, but the profile evidenced by various tests will establish the anti-depressant action if present. A number of such tests are described below.

Hypothermic tests with oxotremorine: [1-[4-(pyrrolidinyl)-2-butynyl]-2-pyrrolidinone].

Oxotremorine (as well as apormorphine and tetrabenazine) produces hypothermic responses in mice. This response is blocked by anticholinergics and antidepressants such as atropine and imipramine.

Oxotremorine produces a very pronounced hypothermia which reaches a peak 6- minutes after administration.

At 0.6 mg./kg. the body temperature of a mouse is decreased about 13° F. (when the mouse is kept at room temperature). This temperature decrease is antagonized by anti-depressants e.g. desipramine, imipramine, doxepine, and others as can be seen from Table 1.

TABLE 1

Effect of Various Compounds on Oxotremorine Induced Hypothermia in Mice

| Compound | Dose mg./kg., I. P. | Absorption Time (min) | Body Temperature °F-Change From Vehicle Control After Minutes | | | |
|---|---|---|---|---|---|---|
| | | | 15 | 30 | 60 | 90 |
| oxotremorine (Control) | 0.6 | | −5.8 | −11.6 | −13.2 | −8.0 |
| Desipramine | 25 | 30 | −3.5 | −3.5 | −4.1 | −3.6 |
| Imipramine | 25 | 30 | −0.4 | −3.3 | −5.6 | −6.4 |
| Iprindole | 25 | 30 | −6.3 | −11.8 | −12.8 | −11.9 |
| Doxepine | 25 | 30 | −2.3 | −7.1 | −11.0 | −12.3 |
| Amitriptyline | 25 | 30 | +0.7 | −2.4 | −5.4 | −6.8 |
| Amphetamine | 5 | 30 | −1.5 | −4.3 | −4.4 | −2.2 |
| Atropine | 3 | 30 | +0.6 | −0.6 | −0.7 | −0.2 |

The test compound A was tested as follows. Four male mice of 18–22 g. (Strain CF=Carworth Farms) were injected intraperitoneally with 1 mg. of oxotremorine. The lowering of the body temperature was measured rectally with an electronic thermometer, before and 30 minutes after drug administration. After the drug administration the mice were kept at 19° C. in cages. A rise of 4° F. of the body temperature of the treated animal against the control animal shows activity. The test compound showed this activity at a dosage of 25 mg./kg.

Potentiation of yohimbine aggregation toxicity: the $LD_{50}$ of yohimbine hydrochloride in mice is 45 mg./kg. i.p. Administration of 30 mg./kg. of yohimbine hydrochloride was non-lethal. If an antidepressant is administered prior to the yohimbine hydrochloride (30 mg.) the lethality of the yohimbine hydrochloride is increased.

Ten male CF mice, 18–22 g., were injected with yohimbine hydrochloride in saline solution. After two hours the $LD_{50}$ are determined. Groups of ten mice are injected with the antidepressant 30 minutes before the administration of yohimbine hydrochloride [YCl] (30 mg.). No mice or only one mouse is killed from 30 mg. of [YCl]. If [YCl] is administered in the presence of an anti-depressant an increase in the toxicity of [YCl] is found. The $ED_{50}$ value of the test compound A causing 50% of the mice to die is 8.8 mg./kg.

Potentiation of apomorphine gnawing: a group of 4 mice (male, CF' 18–22 g.) are administered the test compound A intraperitoneally one hour prior to the subcutaneous injection of apomorphine hydrochloride 10 mg./kg. The mice are then placed in a plastic box (6 × 11 × 5'') lined at the bottom with a cellophane-backed, absorbent paper. The degree of damage to the paper at the end of 30 min. is scored from zero to 4. The scores 3 and 4 indicate that the compound is a potentiator of apomorphine in this test. Test compound A was positive in this test at 35 mg./kg. in mice.

2-[3-(dimethylamino)propyl]dibenzo[b,f]-s-triazolo-[4,3-d][1,4]-oxazepin-3(2H)-onehydrochloride is active in the yohimbine test at 35 mg./kg., and apomorphine test at 30 mg./kg., in the chimney test at 18 mg./kg. in the dish test at 2.8 mg./kg., in the pedestal test at 10 mg., and in the nicotine test at 2.5 mg./kg.

The above results show that compounds of formula III and the pharmacologically acceptable acid addition salts thereof can be used as tranquilizer and antidepressants in mammals to achieve normalcy in the depressed individual, and to overcome anxiety.

The pharmaceutical forms of compounds of formula III, and the pharmacologically acceptable acid addition salts thereof can be used as tranquilizer and antidepressants in mammals to achieve normalcy in the depressed individual, and to overcome anxiety.

The pharmaceutical forms of compounds of formula III, and salts thereof contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates, lactose, proteins, lipids, calcium phosphate, cornstarch, stearic acid, methylcellulose and the like may be used as carriers or for coating purposes. Water or oils such as coconut oil, sesame oil, safflower oil, cottonseed oil, and peanut oil, may be used for preparing solutions or suspensions of the active drug. Sweetening, coloring, and flavoring agents may be added.

For mammals food premixes with starch, oatmeal, dried fishmeat, fishmeal, flour, and the like can be prepared.

As antidepressants and tranquilizers the compounds of formulae II and III (including IIIA and IIIB) their pharmacologically acceptable acid addition salts can be used in dosages of 0.5–25 mg./kg., with 1–15 mg. preferred, in oral or injectable preparations as described above to alleviate anxieties and depressions occurring in stressful situations. Such situations are those for example, where animals are changing ownerships or are temporarily put into kennels while their owners are absent from home. In larger animals, 10 kg. and more, the lower dosage ranges are preferred.

Acid addition salts of the compounds of formula III can be made, such as the fluosilicic acid addition salts which can be applied as mothproofing agents, and salts with trichloroacetic acid are useful as herbicides against Johnson grass, Bermuda grass, yellow and red foxtail, and quack grass.

The starting materials of this invention are dihydrodibenzoxazepinethiones I which are either known or can be synthesized, for simplicity by treating the corresponding oxazepine compounds with phosphorus pentasulfide as further illustrated by the Preparations.

Useful 10,11-dihydro-11-oxo-dibenzo[b,f]-1,4-oxazepines and their synthesis are in particular disclosed by Schmutz et al., Helv. Chim. Acta. 48, 336 (1965).

In carrying out the process of this invention, a selected thione I, is heated with an alkyl carbazate of the formula:

$H_2N-NH-COOAlk$ in which the alkyl group is of 1 to 3 carbon atoms, inclusive. Usually ethyl carbazate is preferred, but higher alkyl carbazates are operative. In the preferred embodiment of this invention, the selected thione I is heated with ethyl carbazate in large excess for ½ hour to 3 hours at 190° to 250° C. in an oil bath. The alkyl carbazate serves simultaneously as reagent and solvent. The product usually precipitates upon cooling of the reaction mixture and is recovered by filtration and purified by conventional means, e.g., extractions of impurities, chromatography or most commonly by recrystallization. The triazolone compound II is thus, obtained.

Alkylation of II is achieved by reacting the product II with a strong base e.g. sodium or potassium hydride in an organic solvent, e.g. dimethylformamide, diethylformamide, diethylacetamide, tetrahydrofuran, dioxane, benzene or the like with an excess of the base, followed by reacting the alkali metal salt thus formed with $R_1'X$ in which X is chlorine, bromine, or iodine and $R_1'$ is defined as above. Both reactions, formation of salt and the reaction of this salt with $R_1'X$, are usually performed at elevated temperatures between 50 to 125° C. The conversion of II to its alkali salt is usually performed during 15–75 minutes. The reaction of the salt with the chloride is carried out during a longer period of time by keeping the reaction mixture at the elevated temperature for 1 to 36 hours. The product III, thus obtained, is isolated and purified by conventional means e.g. extraction, chromatography, crystallization and the like.

The following preparations and examples are illustrative of the processes and products of the present invention, but are not to be construed as limiting.

Preparation 1 dibenzo[b,f][1,4]oxazepine-11(10H)-thione

A mixture of dibenzo[b,f][1,4]oxazepin-11(10H)-one (10 g.) phosphorus pentasulfide (23.3 g.; 0.105 mole) and 830 ml. of pyridine is heated at reflux temperature for 5 hours and the pyridine is evaporated in vacuo. The residue is stirred with chloroform, and 400 ml. of saturated aqueous sodium bicarbonate solution is added. The resulting suspension is filtered and the solid is discarded. The filtrate is separated into layers, and the organic layer is washed successively with aqueous sodium bicarbonate and with saturated salt solution, dried over anhydrous magnesium sulfate and evaporated. The residue was crystallized from methylene chloride-methanol to give 2-fluoro-dibenzo[b,f][1,4]oxazepin-11(10H)-thione.

Other starting materials of formula I are produced as shown in the preceding Preparations. Such starting materials include:

3,8-difluorodibenzo[b,f][1,4]oxazepine-11(10H)-thione;
4,7-dibromodibenzo[b,f][1,4]oxazepine-11(10H)-thione;
2,8-methoxy-11H-dibenzo[b,f][1,4]oxazepine-11(10H)-thione;
8-methyl-11H-dibenzo[b,f][1,4]oxazepine-11(10H)-thione;
4-ethyl-dibenzo[b,f][1,4]oxazepine-11(10H)-thione;
1-methyl-1-dibenzo[b,f][1,4]oxazepine-11(10H)-thione;
1-bromo-2,5,10-dihydro-11H-dibenzo[b,f][1,4]oxazepine-11-(10H)-thione;
2,8-difluoro-11H-dibenzo[b,f][1,4]oxazepine-11(10H)-thione;
1-methyl-9-chloro-dibenzo[b,f][1,4]oxazepin-11(10H)-thione;
2-fluoro-6-chloro-dibenzo[b,f][1,4]oxazepin-11(10H)-thione;
4-methoxy-6-nitro-dibenzo[b,f][1,4]oxazepin-11(10H)-thione; and the like.

EXAMPLE 1

Dibenzo[b,f]-s-triazolo[4,3-d][1,4]oxazepin-3-(2H)-one

A mixture of dibenzo[b,f][1,4]oxazepin-11(10H)-thione (2.59 g., 0.01 mole) and ethyl carbazate (10.4 g., 0.1 mole) was immersed for 15 minutes at 205°–210° C. in an oil bath which had been preheated to that temperature. During that time 1 ml. of liquid was collected via a takeoff condenser. The clear yellow solution was cooled to about 40° C. and diluted with 50 ml. of water. The resulting suspension was filtered and the dibenzo[b,f]-s-triazolo-[4,3-d][1,4]oxazepin-3(2H)-one, thus obtained, was washed with water and crystallized from methanol, weight 1.6 g. melting point 258°–260° C. Second crop weighed 0.248 g. of melting point 253°–255° C.

Anal. calcd. for $C_{14}H_9N_3O_2$:
C, 66.93; H, 3.61; N, 16.73.
Found: C, 66.70; H, 3.53; N, 16.85.

EXAMPLE 2

2-[2-(Dimethylamino)ethyl]dibenzo[b,f]-s-triazolo[4,3-d][1,4]oxazepin-3(2H)-one

Sodium hydride (0.218 g., 5.17 mmoles of 57% suspension in mineral oil) is added to a solution of dibenzo[b,f]-s-triazolo[4,3-d][1,4]oxazepin-3(2H)-one (1.3 g., 5.17 mmoles) in 50 ml. of dimethylformamide and the mixture is heated for 30 minutes at 95° C. A solution of 2-dimethylaminoethyl chloride (0.555 g., 5.17 mmoles) in 0.555 g. of xylene is added and the mixture heated at 95°C. for 17 hours and evaporated. Water and methylene chloride were added. The organic layer was extracted with 10% aqueous hydrochloric acid (3 × 15 ml.), the acidic extract was washed with ether (discard ether), cooled, basified with 20% aqueous sodium hydroxide and extracted with methylene chloride. The organic solution was washed with saturated salt solution, dried and evaporated. The crude product thus obtained was crystallized from ether and petroleum ether (b. p. 30°–60°) to give 0.65 g. of 2-[2-(dimethylamino)-ethyl]dibenzo[b,f]-s-triazolo[4,3-d][1,4]oxazepin-3(2H)-one of melting point 109°–111° C. After recrystallization from ether the melting point was 103°–104° C.

EXAMPLE 3

2-[3-(dimethylamino)propyl]dibenzo[b,f]-s-triazolo[4,3-d][1,4]oxazepin-3(2H)-one and its hydrochloride In the manner given in Example 2, dibenzo[b,f]-s-triazolo[4,3-a][1,4]ozazepine-11(10H)-one was treated with sodium hydride and the resulting product was treated with 3-(dimethylamino)propyl chloride to give 10.1 g. of 2-[3-(dimethylamino)propyl]dibenzo[b,f]-s-triazolo[4,3-d][1,4]oxazepin-3(2H)-one as an oil. The hydrochloride was formed in ether and crystallized from methanol-ether to give 8.8 g. of 2-[3-(dimethylamino)propyl]dibenzo[b,f]-s-triazolo-[4,3-d][1,4]oxazepin-3(2H)-one hydrochloride of melting point 183°–184° C.

Anal. calcd. for $C_{19}H_{20}N_4O_2 \cdot HCl \cdot 1.5H_2O$:
C, 57.14; H, 5.93; Cl, 8.88; N, 14.03.
Found: C, 57.37; H, 5.41; Cl, 9.04; N, 14.54.

EXAMPLE 4

2-[2-(Diethylamino)ethyl]dibenzo[b,f]-s-triazolo[4,3-a][1,4]oxazepin-11(10H)-one In the manner given in Example 2, dibenzo[c,f]-s-triazolo[4,3-a][1,4]oxazepin-11(10H)-one was treated with sodium hydride and then with diethylaminoethyl chloride to give 2-[2-(diethylamino)ethyl]dibenzo[b,f]-s-triazolo[4,3-d]-[1,4]oxazepin-one.

EXAMPLE 5

2-[2-(1-piperidinyl)ethyl]dibenzo[c,f]-s-triazolo[4,3-a][1,4]oxazepin-3(2H)-one hydrochloride In the manner given in Example 2, dibenzo[b,f]-s-triazolo[4,3-d][1,4]oxazepin-11(10H)-one was treated with sodium hydride and 1-2-chloroethyl)piperidine to give after extraction with hydrochloric acid 2-[2-(1-piperidinyl)ethyl]-dibenzo[b,f]-s-triazolo[4,3-d][1,4]oxazepin-2H-one dihydrochloride.

EXAMPLE 6

2-[2-(phthalimido)ethyl]dibenzo[b,f]-s-triazolo-[4,3-d][1,4]oxazepin-3(2H)-one

In the manner given in Example 2, dibenzo[b,f]-s-triazolo[4,3-d][1,4]oxazepin-3(2H)-one is first reacted with sodium hydride, and the resulting product with N-(2-bromoethyl)phthalimide to give 2-[2-(phthalimido)ethyl]dibenzo[b,f]-s-triazolo[4,3-d][1,4]oxazepin-3(2H)-one.

EXAMPLE 7

2-[2-(amino)ethyl]dibenzo[b,f]-s-triazolo[4,3-d]-[1,4]oxazepin-3(2H)-one

A mixture of 2-[2-(phthalimido)ethyl]dibenzo[b,f]-s-triazolo[4,3-d][1,4]oxazepin-3(2H)-one (4.47 mmole), hydrazine hydrate (0.0179 mole) and 25 ml. of ethanol was stirred at room temperature for 24 hours. The resulting suspension was filtered and the filtrate evaporated. The residue is dissolved in methylene chloride and water. The organic layer was washed with water, dried over anhydrous magnesium sulfate and evaporated to give 2-[2-(amino)ethyl]dibenzo[b,f]-s-triazolo[4,3-d][1,4]oxazepin-3(2H)-one.

EXAMPLE 8

2-[2-(benzylmethylamino)ethyl]dibenzo[b,f]-s-triazolo[4,3-d]oxazepin-3(2H)-one

In the manner given in Example 2, dibenzo[b,f]-s-triazolo[4,3-d][1,4]oxazepin-3(2H)-one is first reacted with sodium hydride, and the resulting product with N-benzyl-N-methyl-2chloroethylamine to give 2-[2-(benzylmethylamino)-ethyl]dibenzo[b,f]-s-triazolo[4,3-d][1,4]oxazepin-3(2H)-one.

EXAMPLE 9

2-[2-(methylamino)ethyl]dibenzo[b,f]-s-triazolo-[4,3-d][1,4]oxazepin-3(2H)-one

A mixture of 2-[2-(benzylmethylamino)ethyl]dibenzo[b,f]-s-triazolo[4,3-d][1,4]oxazepin-3(2H)-one (0.0367 mole), palladium 1.1 g. of 10% palladium on carbon, 74 ml. of 1N ethereal hydrogen chloride (0.0735 mole) and 240 ml. of methanol was hydrogenated at 50 p.s.i. until absorption of hydrogen was complete. The mixture was filtered and the filtrate evaporated to give 2-[2-(methylamino)ethyl]dibenzo[b,f]-s-triazolo[4,3-d][1,4]oxazepin-3(2H)-one.

EXAMPLE 10

2-[3-(Diethylamino)propyl]dibenzo[b,f]-s-triazolo[4,3-d][1,4]oxazepin-3(2H)-one hydrochloride In the manner given in Example 2, dibenzo[b,f]-s-triazolo[4,3-d][1,4]oxazepin-3(2H)-one was first treated with sodium hydride, and the resulting product with 3-(diethylamino)propyl chloride to give after extraction with hydrochloric acid 2-[2-(diethylamino)propyl]dibenzo[b,f]-s-triazolo[4,3-d][1,4]oxazepin-3(2H)-one hydrochloride.

EXAMPLE 11

7-Chloro-dibenzo[b,f]-s-triazolo[4,3-d][1,4]-oxazepin-3(2H)-one

A mixture of 7-chloro-dibenzo[b,f][1,4]oxazepine-11(10H)-thione (15.1 g.; 0.058 mole) and ethyl carbazate (60.3 g.; 0.58 mole) was heated in an oil bath at 205°–215° C. for one hour using a take off condenser. The mixture was cooled to 40° C., shaken with 200 ml. of water for for 3 hours until a fine suspension resulted and filtered. The solid was washed with water and then ether to give 14.7 g. of 7-chloro-dibenzo[b,f]-s-triazolo[4,3-d]-[1,4]oxazepin-3(2H)-one of melting point 313°–314° C. This was unchanged on crystallization from methanol-chloroform.

Anal. calcd. for $C_{14}H_8ClN_3O_2$:
C, 58.86; H, 2.82; Cl, 12.41; N, 14.71.
Found: C, 58.85; H, 2.90; Cl, 12.59; N, 14.69.

EXAMPLE 12

7-Chloro-2-[2-(dimethylamino)ethyl]dibenzo[b,f]-s-triazolo[4,3-d][1,4]oxazepin-3(2H)-one In the manner given in Example 2, 7-chloro-dibenzo[b,f]-s-triazolo[4,3-d][1,4]oxazepin-3(2H)-one, sodium hydride and 2-(dimethylamino)ethyl chloride gave 7-chloro-2-[2-(dimethylamino)ethyl]dibenzo[b,f]-s-triazolo[4,3-d]-[1,4]oxazepin-3(2H)-one of melting point 136°–138°, raised upon recrystallization from ether to 142°–143° C.

Anal. calcd. for $C_{18}H_{17}ClN_4O_2$:
C, 60.59; H, 4.80; Cl, 9.94; N, 15.70.
Found: C, 60.48; H, 4.88; Cl, 9.88; N, 15.92.

EXAMPLE 13

7-Chloro-2-[3-(dimethylamino)propyl]dibenzo[b,f]-s-triazolo[4,3-d][1,4]oxazepin-3(2H)-one and its hydrochloride In the manner given in Example 2, 7-chloro-dibenzo[b,f]-s-triazolo[4,3-d][1,4]oxazepin-3(2H)-one was treated with sodium hydride and then with 3-(dimethylamino)propyl chloride to give 6.9 gm. of 7-chloro-2-[3-(dimethylamino)propyl]dibenzo[b,f]-s-triazolo[4,3-d][1,4]oxazepin-3(2H)-one as an oil. The hydrochloride was prepared in ether and had a melting point of 228°–229° C.

Anal. calcd. for $C_{19}H_{19}ClN_4O_2 \cdot HCl$:
C, 56.03; H, 4.95; Cl, 17.41; N, 13.76.
Found: C, 56.34; H, 4.93; Cl, 17.54; N, 14.10.

EXAMPLE 14

7-Fluoro-dibenzo[b,f]-s-triazolo[4,3-d][1,4]oxazepin-3(2H)-one

In the manner given in Example 1, 7-fluoro-dibenzo[b,f][1,4]oxazepin-11(10H)-thione and ethyl carbazate are reacted together at 200°–215° C. to give 7-fluorodibenzo[b,f]-s-triazolo[4,3-d][1,4]oxazepin-3(2H)-one.

EXAMPLE 15

7-Fluoro-2-[2-(dimethylamino)ethyl]-dibenzo[b,f]-s-triazolo[4,3-d][1,4]oxazepin-3(2H)-one In the manner given in Example 2, 7-fluoro-dibenzo[b,f]-s-triazolo[4,3-d][1,4]oxazepin-3(2H)-one is first reacted with sodium hydride, and the resulting product with 2-(dimethylamino)ethyl chloride to give 7-fluoro-2-[2-(dimethylamino)ethyl]dibenzo[b,f]-s-triazolo[4,3-d][1,4]oxazepin-3(2H)-one

EXAMPLE 16

10-Propyldibenzo[b,f]-s-triazolo[4,3-d][1,4]-oxazepin3(2H)-one

In the manner given in Example 1, 4-propyl-dibenzo[b,f][1,4]oxazepin-11(10H)-thione and ethyl carbazate are reacted together and 200°–215° C. to give 10-propyldibenzo[b,f]-s-triazolo[4,3-d][1,4]oxazepin-3(2H)-one.

EXAMPLE 17

2-Ethyl-dibenzo[b,f]-s-triazolo[4,3-d][1,4]-oxazepin-3(2H)-one

In the manner given in Example 2, dibenzo-[b,f]-s-triazolo[4,3-d][1,4]oxazepin-3(2H)-one was first treated with sodium hydride and then with ethyl bromide to give 2-ethyldibenzo[b,f]-s-triazolo[4,3-d][1,4]oxazepin-3(2H)-one.

EXAMPLE 18

7,11-Dichlorodibenzo[b,f]-s-triazolo[4,3-d]-[1,4]oxazepin-3(2H)-one

In the manner given in Example 1, 3,7-dichlorobenzo[b,f][1,4]oxazepin-11(10H)-thione and ethyl carbazate are reacted together at 200°–215° C. to give 7,11-dichlorodibenzo[b,f]-s-triazolo[4,3-d][1,4]oxazepin-3(2H)-one.

EXAMPLE 19

7,11-dichloro-2-[3-(dimethylamino)propyl]dibenzo[b,f]-s-triazolo[4,3-d][1,4]oxazepin-3(2H)-one In the manner given in Example 2, 7,11-dichlorodibenzo[b,f]-s-triazolo[4,3-d][1,4]oxazepin-3(2H)-one is first reacted with sodium hydride and the resulting product with 3-(dimethylamino)propyl chloride to give 7,11-dichloro-2-]3-(dimethylamino)propyl]dibenzo[b,f]-s-triazolo[4,3-d]-[1,4]oxazepin-3(2H)-one.

EXAMPLE 20

6,11-difluoro-dibenzo[b,f]-s-triazolo[4,3-d]-[1,4]oxazepin-3(2H)-one

In the manner given in Example 1, 3,8-difluorodibenzo[b,f][1,4]oxazepin-11(10H)-thione and ethyl carbazate are reacted together at 200°–215° C. to give 6,11-difluorodibenzo[b,f]-s-triazolo[4,3-d][1,4]oxazepin-3(2H)-one.

EXAMPLE 21

6,11-difluoro-2-propyldibenzo[b,f]-s-triazolo-[4,3-d][1,4]oxazepin-3(2H)-one

In the manner given in Example 2, 6,11-difluorodibenzo[b,f]-s-triazolo[4,3-d][1,4]oxazepin-3(2H)-one is first treated with sodium hydride and then with ethyl bromide to give 6,11-difluoro-2-propyldibenzo[b,f]-s-triazolo[4,3-d]-[1,4]oxazepin-3(2H)-one.

EXAMPLE 22

6,11-difluoro-2-[2-(diethylamino)ethyl]dibenzo-[b,f]-s-triazolo[4,3-d][1,4]oxazepin-3(2H)-one In the manner given in Example 2, 6,11-difluorodibenzo[b,f]-s-triazolo[4,3-d][1,4]oxazepin-3(2H)-one is first treated with sodium hydride and then with 2-(diethylamino)-ethyl bromide to give 2-[2-(diethylamino)ethyl]-6,11-difluoro-dibenzo[b,f]-s-triazolo[4,3-d][1,4]oxazepin-3(2H)-one

EXAMPLE 23

7,10-dibromo-dibenzo[b,f]-s-triazolo[4,3-d][1,4]-oxazepin-3(2H)-one

In the manner given in Example 1, 4,7-dibromo-dibenzo-[b,f][1,4]oxazepin-11(10H)-thione and ethyl carbazate are reacted together at 200°–215° C. to give 7,10-dibromodibenzo[b,f]-s-triazolo[4,3-d][1,4]oxazepin-3(2H)-one.

EXAMPLE 24

7,10-dibromo-2-[2-(dipropylamino)ethyl]dibenzo-[b,f]-s-triazolo[4,3-d][1,4]oxazepin-3(2H)-one In the manner given in Example 2, 7,10-dibromo-dibenzo[b,f]-s-triazolo[4,3-d][1,4]oxazepin-3(2H)-one was first treated with sodium hydride and then with 2-(dipropylamino)ethyl bromide to give 2-[2-(dipropylamino)ethyl]-7,10-dibromodibenzo[b,f]-s-triazolo[4,3-d][1,4]oxazepin-3(2H)-one.

EXAMPLE 25

6,12-dimethoxydibenzo[b,f]-s-triazolo[4,3-d]-[1,4]oxazepin-3(2H)-one

In the manner given in Example 1, 2,8-dimethoxydibenzo[b,f][1,4]oxazepin-11(10H)-thione and ethyl carbazate are reacted together at 200°–215° to give 6,12-dimethoxydibenzo[b,f]-s-triazolo[4,3-d][1,4]oxazepin-3(2H)-one.

EXAMPLE 26

6,12-dimethoxy-2-methyl-dibenzo[b,f]-s-triazolo[4,3-d][1,4]oxazepin-3(2H)-one

In the manner given in Example 2, 6,12-dimethoxydibenzo[b,f]-s-triazolo[4,3-d][1,4]oxazepin-3(2H)-one was first treated with sodium hydride and then with methyl bromide to give 2-methyl-6,12-dimethoxy-dibenzo[b,f]-s-triazolo[4,3-d][1,4]oxazepin-3(2H)-one.

EXAMPLE 27

7-Nitro-dibenzo[b,f]-s-triazolo[4,3-d][1,4]oxazepin-3(2H)-one

In the manner given in Example 1, 7-nitro-dibenzo-[b,f][1,4]oxazepin-11(10H)-thione and ethyl carbazate are reacted together at 200°–215° C. to give 7-nitro-dibenzo[b,f]-s-triazolo[4,3-d][1,4]oxazepin-3(2H)-one.

EXAMPLE 28

2-(Pyrrolidinoethyl)-7-nitro-dibenzo[b,f]-s-triazolo[4,3-d][1,4]oxazepin-3(2H)-one In the manner given in Example 2, 7-nitro-dibenzo[b,f]-s-triazolo[4,3-d][1,4]oxazepin-3(2H)-one was first treated with sodium hydride and then with pyrrolidinoethyl bromide to give 2-(pyrrolidinoethyl)-7-nitro-dibenzo[b,f]-s-triazolo[4,3-d][1,4]oxazepin-3(2H)-one.

EXAMPLE 29

7-nitro-3-piperidinopropyldibenzo[b,f]-s-triazolo[4,3-d][1,4]oxazepin-3(2H)-one

In the manner given in Example 2, 7-nitro-dibenzo[b,f]-s-triazolo[4,3-d][1,4]oxazepin-3(2H)-one was first treated with sodium hydride and then with 3-piperidinopropyl bromide to give 7-nitro-2-[3-(piperidino)propyl]dibenzo[b,f]-s-triazolo[4,3-d][1,4]oxazepin-3(2H)-one.

EXAMPLE 30

11-Nitro-dibenzo[b,f]-s-triazolo[4,3-d][1,4]oxazepin-3(2H)-one

In the manner given in Example 1, 3-nitrodibenzo[b,f]-s-triazolo[1,4]oxazepin-11(10H)-thione and ethyl carbazate are reacted together at 200°–215° C. to give 11-nitrodibenzo[b,f]-s-triazolo[4,3-d][1,4]oxazepin-3-(2H)-one.

EXAMPLE 31

11-Nitro-2-isopropyl-dibenzo[b,f]-s-triazolo[4,3-d][1,4]oxazepin-3(2H)-one.

In the manner given in Example 2, 11-nitro-dibenzo-[b,f]-s-triazolo[4,3-d][1,4]oxazepin-3(2H)-one is first treated with sodium hydride and then with 2-isopropyl bromide to give 2-isopropyl-11-nitro-dibenzo[b,f]-s-triazolo-[4,3-d][1,4]oxazepin-3(2H)-one.

EXAMPLE 32

5-Chloro-13-methyldibenzo[b,f]-s-triazolo[4,3-d][1,4]oxazepin-3(2H)-one

In the manner given in Example 1, 9-chloro-1-methyldibenzo[b,f][1,4]oxazepin-11(10H)-thione and ethyl carbazate are reacted together at 200°–215°C. to give 5-chloro-13-methyldibenzo[b,f]-s-triazolo[4,3-d][1,4]oxazepin-3(2H)-one.

EXAMPLE 33

5-Chloro-13-methyl-2-[(3-piperidinopropyl)]-dibenzo[b,f]-s-triazolo[4,3-d][1,4]oxazepin-3(2H)-one In the manner given in Example 2, 5-chloro-13-methyldibenzo[b,f]-s-triazolo[4,3-d][1,4]oxazepin-3(2H)-one is first treated with sodium hydride and then with 3-(piperidinopropyl)bromide to give 2-[(3-piperidino)propyl]-5-chloro-13-methyl-dibenzo[b,f]-s-triazolo[4,3-d][1,4]oxazepin-3(2H)-one.

In the manner illustrated by the prior examples other compounds of formula III can be synthesized. Representative compounds, thus obtained, include:

2-[(2-methylamino)ethyl]-7-chloro-dibenzo[b,f]-s-triazolo[4,3-d][1,4]oxazepin-3(2H)-one;
2-[(2-pyrrolidino)ethyl]-7-chloro-dibenzo[b,f]-s-triazolo[4,3-d][1,4]oxazepin-3(2H)-one;
2-ethyl-8-fluoro-7-chloro-dibenzo[b,f]-s-triazolo[4,3-d]-[1,4]oxazepin-3(2H)-one;
2-methyl-12-methoxy-5-bromo-dibenzo[b,f]-s-triazolo[4,3-d]-[1,4]oxazepin-3(2H)-one;
2-propyl-11-methyldibenzo[b,f]-s-triazolo[4,3-d][1,4]oxazepin-3(2H)-one;
2-isopropyl-7-trifluoromethyl-dibenzo[b,f]-s-triazolo[4,3-d][1,4]oxazepin-3(2H)-one;
2[2-(piperidino)ethyl]dibenzo[b,f]-s-triazolo[4,3-d][1,4]-oxazepin-3(2H)-one;
2-[3-(piperidino)propyl]dibenzo[b,f]-s-triazolo[4,3-d]-[1,4]oxazepin-3(2H)-one;
5-trifluoromethyl-dibenzo[b,f]-s-triazolo[4,3-d][1,4]oxazepin-3(2H)-one;
6-chloro-dibenzo[b,f]-s-triazolo[4,3-d][1,4]oxazepin-3(2H)-one;
8,13-dibromo-dibenzo[b,f]-s-triazolo[4,3-d][1,4]oxazepin3(2H)-one;
5,10-dichloro-dibenzo[b,f]-s-triazolo[4,3-d][1,4]oxazepin3(2H)-one;
2-methyl-8,12-diethyl-dibenzo[b,f]-s-triazolo[4,3-d][1,4]oxazepin-3(2H)-one;
5-propyl-dibenzo[b,f]-s-triazolo[4,3-d][1,4]oxazepin-3(2H)-one;
8-isopropyl-dibenzo[b,f]-s-triazolo[4,3-d][1,4]oxazepin3(2H)-one;
2-isopropyl-10-methyl-dibenzo[b,f]-s-triazolo[4,3-d][1,4]oxazepin-3(2H)-one;
2-[2-(4-methylpiperazino)ethyl]dibenzo[b,f]-s-triazolo-[4,3-d][1,4]oxazepin-3(2H)-one; and the like.

The novel compounds of formula III (IIIA and IIIB included) can be reacted with selected acids e.g. hydrochloric, hydrobromic, sulfuric, phosphoric, tartaric, citric, lactic, cyclohexanesulfamic, toluenesulfonic and other acids to give the corresponding pharmaceutically acceptable acid addtion salts. This reaction is carried out under conventional conditions, in solvents such as ether, dioxane, tetrahydrofuran and the like at room temperatures, and the resulting precipitate salts are collected by filtration. These salts can be used in place of the free base for the same pharmaceutical purpose described before.

I claim:
1. A compound of the formula:

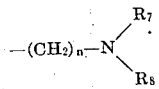

wherein $R_1$ is hydrogen, alkyl of 1 to 3 carbon atoms, inclusive, or

in which $n$ is 2 or 3, and $R_7$ and $R_8$ is hydrogen or alkyl defined as above, or together

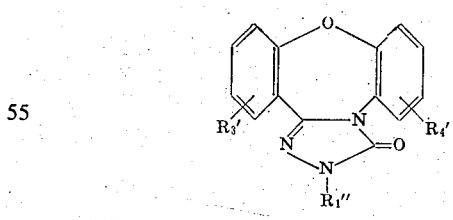

is pyrrolidino, N-methyl piperazino, or piperidino; and wherein $R_3$ and $R_4$ are hydrogen, fluorine, chlorine, bromine, nitro, alkyl as defined above, trifluoromethyl, or alkoxy of 1 to 3 carbon atoms, inclusive and the pharmacologically acceptable acid addition salts thereof.

2. A compound according to claim 1 of the formula

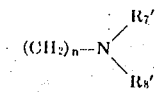

wherein $R_1''$ is alkyl of 1 to 3 carbon atoms, inclusive or in which n is 2 or 3 and $R_7'$ and $R_8'$ are alkyl defined as above; and wherein $R_3'$ and $R_4'$ are hydrogen, fluoro, chloro, or bromo and the pharmacologically acceptable acid addition salts thereof.

3. A compound according to claim 1 of the formula

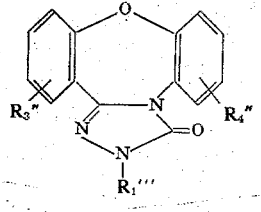

wherein $R_1'''$ is

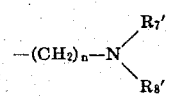

in which n is 2 or 3, $R_7'$ and $R_8'$ are alkyl of 1 to 3 carbon atoms, inclusive; and wherein $R_3''$ and $R_4''$ are hydrogen or chlorine and the pharmacologically acceptable acid addition salts thereof.

4. A compound according to claim 1, wherein $R_1$, $R_3$, and $R_4$ are hydrogen and the compound is therefore dibenzo[b,f]-s-triazolo[4,3-d][1,4]oxazepin-3(2H)-one.

5. A compound according to claim 3, wherein $R_1'''$ is 2-(dimethylamino)ethyl, $R_3''$ and $R_4''$ are hydrogen and the compound is therefore 2-[2-(dimethylamino)ethyl-dibenzo[b,f]-s-triazolo[4,3-d][1,4]oxazepin-3(2H)-one.

6. A compound according to claim 3 wherein $R_1'''$ is 3-(dimethylamino)propyl, $R_3''$ and $R_4''$ are hydrogen and the compound is therefore 2-[3-(dimethylamino)propyl]-dibenzo[b,f]-s-triazolo[4,3-d][1,4]oxazepin-3(2H)-one.

7. The compound of claim 6 as hydrochloride.

8. A compound according to claim 3, wherein $R_1'''$ is 2-(dimethylamino)ethyl, $R_3''$ is hydrogen $R_4''$ is 7-chloro, and the compound is therefore 7-chloro-2[2-(dimethylamino)ethyl]-dibenzo[b,f]-s-triazolo[4,3-d][1,4]oxazepin-3(2H)-one.

9. A compound according to claim 3 wherein $R_1'''$ is 3-(dimethylamino)propyl, $R_3''$ is hydrogen, $R_4''$ is 7-chloro and the compound is therefore 7-chloro-2-[3-dimethylamino)propyl-dibenzo[b,f]-s-triazolo[4,3-d][1,4]oxazepin-3(2H)-one.

10. The compound of claim 9 as a hydrochloride.

11. A compound according to claim 1 wherein $R_1$ and $R_3$ are hydrogen $R_4$ is 7-chloro and the compound is therefore 7-chloro-dibenzo[b,f]-s-triazolo[4,3-d][1,4]oxazepin-3(2H)-one.

12. A compound according to claim 3 wherein $R_1'''$ is 2-aminoethyl, $R_3''$ and $R_4''$ are hydrogen and the compound is therefore 2-[2-(aminoethyl)]dibenzo[b,f]-s-triazolo[4,3-d][1,4]-oxazepin-3(2H)-one.

13. A compound according to claim 3 wherein $R_1'''$ is 2-(methylamino)ethyl, $R_3''$ and $R_4$. are hydrogen and the compound is therefore 2-[2-(methylamino)ethyl]dibenzo[b,f]-s-triazolo[4,3-d][1,4]oxazepin-3(2H)-one.

* * * * *